United States Patent [19]

Brioschi

[11] 3,949,372
[45] Apr. 6, 1976

[54] SYSTEM FOR EXTENDING THE INTERIOR DECOR OF A MICROPROGRAMMED COMPUTER

[75] Inventor: Antonio Brioschi, Arcore, Milan, Italy

[73] Assignee: Honeywell Information Systems, Inc., Phoenix, Ariz.

[22] Filed: Oct. 2, 1974

[21] Appl. No.: 511,135

[30] Foreign Application Priority Data
Oct. 10, 1973    Italy .................................. 29930/73

[52] U.S. Cl. ............................................ 340/172.5
[51] Int. Cl.² ..................... G06F 9/16; G06F 13/00
[58] Field of Search ................................ 340/172.5

[56] References Cited
UNITED STATES PATENTS

| | | | |
|---|---|---|---|
| 3,634,883 | 1/1972 | Kreidermacher | 340/172.5 |
| 3,646,522 | 2/1972 | Furman | 340/172.5 |
| 3,673,575 | 6/1972 | Burton et al. | 340/172.5 |
| 3,700,873 | 10/1972 | Yhap | 340/172.5 |
| 3,713,108 | 1/1973 | Edstrom et al. | 340/172.5 |
| 3,728,690 | 4/1973 | Holtey et al. | 340/172.5 |
| 3,768,075 | 10/1973 | Reitsma et al. | 340/172.5 |

Primary Examiner—Gareth D. Shaw
Assistant Examiner—James D. Thomas
Attorney, Agent, or Firm—William W. Holloway, Jr.; David A. Frank

[57] ABSTRACT

The system discriminates between "allowed" and "forbidden" machine instructions by interpreting coded digital words found in an auxiliary memory. "Allowed" instructions found in the microprogramming memory are directly executed. "Forbidden" instructions lead to the execution of exception routines, which determine if the instruction is an "additional" instruction which has a microprogram for its execution in working memory. If so, working memory is accessed and the machine instruction is executed.

10 Claims, 4 Drawing Figures

SYSTEM FOR EXTENDING THE INTERIOR DECOR OF A MICROPROGRAMMED COMPUTER

BACKGROUND OF THE INVENTION

1. Field of the Invention

The present invention relates generally to control systems for data processing systems and more specifically to a system for extending the interior decor of the control unit of a microprogrammed computer.

2. Description of the Prior Art

In microprogrammed computers, execution of a so-called macroinstruction, of the type usually written by a programmer in a high-level language (such as FORTRAN or COBOL), requires the performing of a number of machine instructions in a predetermined order. Each machine instruction, in turn, is executed by means of a sequence of microinstructions which are contained in a microprogramming memory (which generally is a read-only memory).

This type of computer organization has the drawback that the machine instructions provided for the computer are of limited number and are strictly correlated to a predetermined set of microinstructions contained in the microprogramming memory. The set of machine instructions which may be performed by means of a set of microinstructions contained in the microprogramming memory constitutes a so-called "Interior Decor" of the computer. Adding or modifying the microinstructions requires addition or the modification to the microprogramming (read-only) memory which records them. Thus, it is difficult and burdensome to extend the "Interior Decor" of a microprogrammed computer.

In the U.S. patent application Ser. No. 508,970 filed Sep. 25, 1974 by the applicant, a microprogrammed computer has been described in which it is possible to recall microinstructions both from a microprogramming memory and from main or working memory of the computer. This allows the addition of new microinstructions for carrying out machine instructions not previously recognized. However, this does not entirely solve the problem because it is still necessary to correlate each machine instruction with an appropriate microprogram (i.e. a set of microinstructions) for its execution.

It is known that a machine instruction consists of a set of information, including an operating code and the addresses of operands. The operating (or function) code, which is different for each machine instruction, specifies an operation to be performed. The operating code, by means of decoding systems, supplies address of the microprogram for carrying out the machine instruction. Therefore, addition of new machine instructions requires change to or addition of new decoding systems for supplying the addresses of new microprograms for carrying out the additional machine instructions.

OBJECTS OF THE INVENTION

It is an object of the invention, therefore, to provide an improved system for controlling the operation of a microprogrammed computer.

It is another object of the invention to provide an improved system for effectively extending the so-called "Interior Decor" of a microprogrammed computer without structurally changing the read-only microprogramming memory of said microprogrammed computer.

It is another object of the invention to provide an improved system for decoding operating codes of machine instructions and for supplying addresses of microprograms for carrying out so-called "additional" machine instructions.

It is still another object of the invention to provide a system for identifying so-called "forbidden" machine instructions, for further identifying some so-called "additional" machine instructions from said "forbidden" instruction group, and for providing means for carrying out said "additional" instructions by means of microprograms found in a working memory of a microprogrammed computer.

Other objects and advantages of the present invention will become apparent from the following description of the preferred embodiment of the invention when read in conjunction with the drawings contained herewith.

SUMMARY OF THE INVENTION

According to the invention, an auxiliary memory stores an "allowed" digital word for each "allowed" operating code and also stores at least one digital word for "forbidden" operating codes. When the control unit is presented with an operating code of an introduced instruction, the corresponding digital word is read out from the auxiliary memory. Each digital word specifies if the operating code associated with it is allowed or forbidden.

Allowed codes lead directly to the fetching and execution of appropriate microprograms from the microprogramming memory. Information contained in the forbidden digital words causes the calling of a microprogramming routine which is a general exception routine. Such an exception routine determines the reason for recalling it. Upon determining that the reason for its initiation is the presence of a forbidden operating code, the exception routine initiates a special purpose exception routine which considers the content of certain privileged working memory positions. In such privileged working memory positions there may be information which specifies microprograms which allow the execution of certain forbidden machine instruction which have been added in the working memory. Such machine instructions are defined as "added" instructions and their operating codes as "added" codes. If such added codes are not present, the introduced instruction (and code) must be considered forbidden and the microprogramming routine causes the intervention of a supervisor program to indicate to the user the impossibility of executing the introduced machine instruction. If added codes are present, the microprogramming routine determines if the introduced code is one of the added codes. If not, routine will require again the intervention of a supervisor program to indicate to the user the impossibility of executing the required machine instruction. If so, the routine will find the address in working memory of the microinstruction for executing the added operating code and the system will process this microinstruction similarly to allowed microinstructions. In such a way it is possible to extend the Interior Decor of the computer without making any physical changes to the computer.

DESCRIPTION OF THE PREFERRED EMBODIMENT

Before describing the invention, it is desirable to clarify some concepts. Machine instructions generally comprise an operating (or function) code together with information relative to the location of the data to be operated on (the operands). (Sometimes they also have additional information.) The length of the machine instructions may be relatively long or relatively short depending on the quantity of data involved. All of the operating codes used in a single computer, however, have the same length. The operating codes generally indicate the operation to be performed. Once the length of the operating code is established, it is possible to have only a certain fixed set of different operating codes and related machine instruction. However, not all the operating codes which may theoretically be expressed with a certain number of bits (i.e. operating codes within the fixed set) are used to characterize machine instructions for which the computer is provided with microprogramming resources. Generally, only a part or subset is used.

Bit combinations which are utilized as operating codes are defined as "allowed" operating codes and the related instructions as "allowed" instructions. The other bit combinations characterize operating codes which are defined as "forbidden" or "illegal". It is possible to increase the number of microprograms available by using the working memory as support, and therefore, it becomes possible to increase the number of machine instructions for the computer. "Additional" machine instructions are characterized by "forbidden" (or "illegal") operating codes. Such "forbidden" operating codes must be recognized and, if they are related to additional machine instructions, must cause the recall of suitable microprograms.

Figure 1:
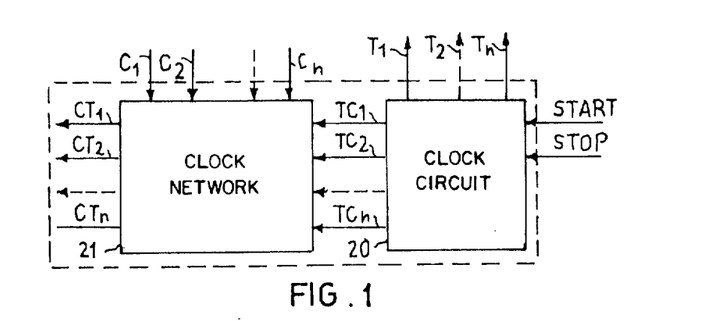
FIG. 1 is a schematic block diagram of the timing unit of a computer.

The preferred embodiment of the invention comprises circuits which may be divided functionally as follows: a timing unit, a microprogrammed control unit, an operating unit, and a working memory. FIG. 1 shows a schematic block diagram of the timing unit. It comprises substantially a clock circuit 20 and a clock network 21. The clock circuit may be of the type comprising a delay line with intermediate taps. The delay line is fed by a one-shot circuit triggered either by an external start signal or by the end terminal of the delay line for cyclically generating succession of clock pulses.

Alternatively, it is known how to make use of a high frequency oscillating circuit for generating a basic frequency. From such a circuit a sequence of clock pulses may be obtained by means of frequency dividers. The operation of the clock circuit may be interrupted at the end of each cycle by means of a command applied to a STOP terminal.

Some of the clock pulses are transferred through the output leads $T_1, T_2, T_3 \ldots T_n$ to different points of the computer where they cyclically control the enabling of predetermined AND gates. Other clock pulses $TC_1, TC_2 \ldots TC_n$ are applied to a clock network 21 which is part of the timing unit.

The clock network 21 also receives a plurality of signals or microcommands $C_1, C_2, C_3 \ldots C_n$ from the control unit. By means of a plurality of AND gates (and, if needed, of flip-flops) under control of the clock pulses $TC_1$ to $TC_n$, the clock network 21 delivers a sequence of microcommands suitably timed and having suitable durations $CT_1$ to $CT_n$. The microcommands are distributed by means of a proper control network (which is not shown) to suitable parts of the computer (including the control unit, the operating section and the memory section.)

Figure 2:
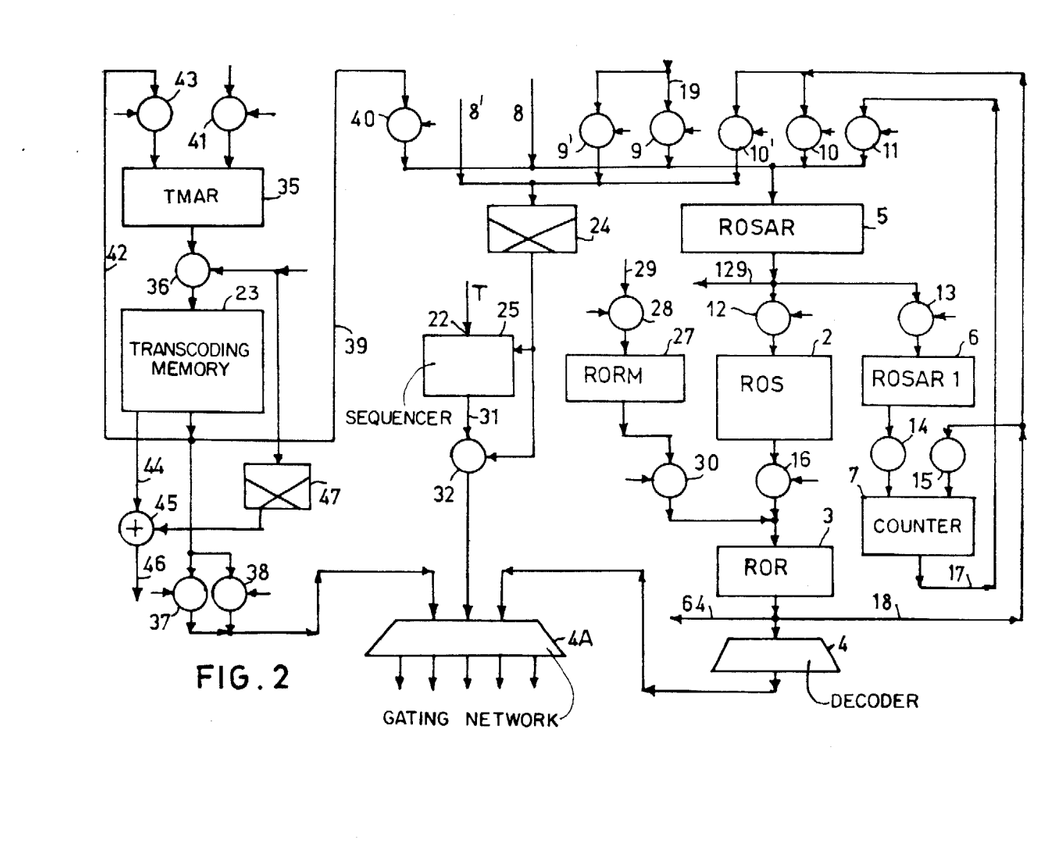
FIG. 2 is a schematic block diagram of the control unit of the computer.
Figure 3:
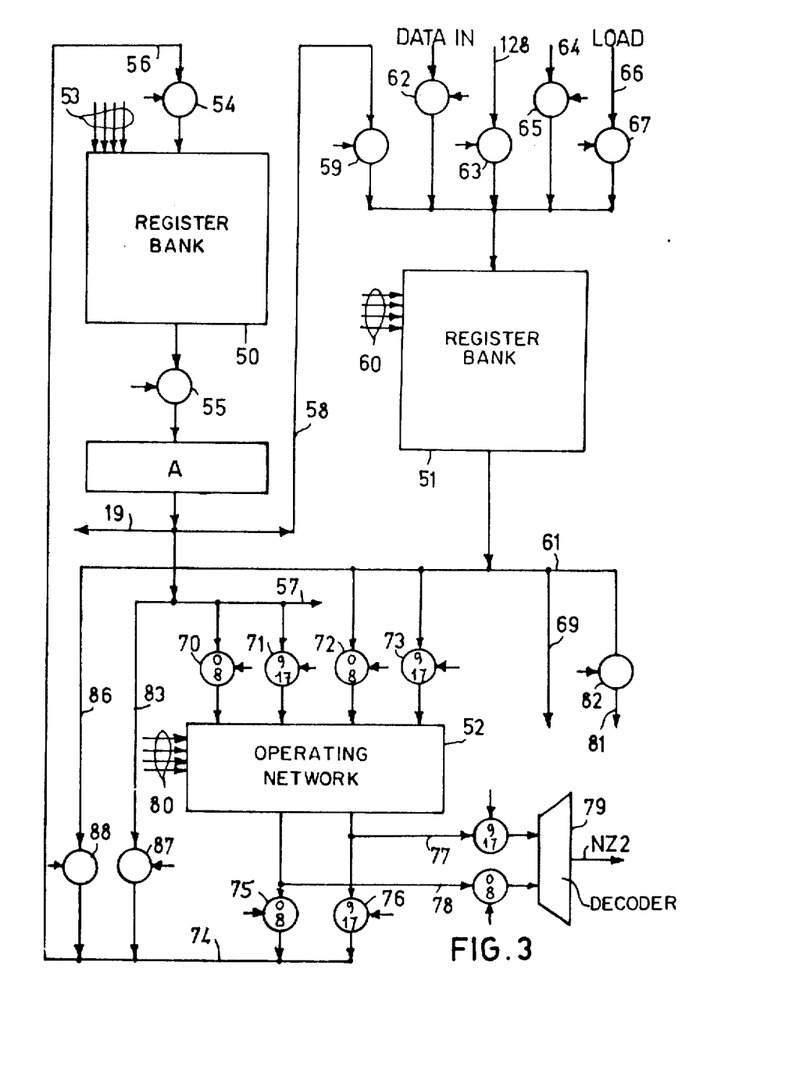
FIG. 3 is a schematic block diagram of the operating section of the computer.
Figure 4:
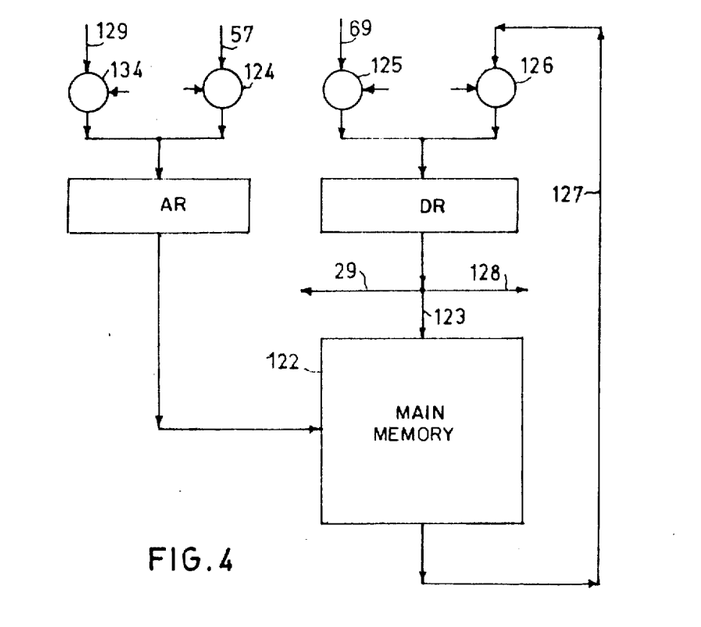
FIG. 4 is a schematic block diagram of the main memory of the computer.

Before describing FIGS. 2, 3 and 4, it should be noted that in each of these figures, an arrow pointing to the input of a conditioning element, (which is represented by a circle), indicates that a clock pulse $T_1$ to $T_n$ or a clocked microcommand $CT_1$ to $CT_n$ is applied to the conditioning element through the connection represented by the arrow.

Also, it should be noted that the difference between clock pulses and clocked microcommands is that the clock pulses are unconditionally delivered in each cycle of the clock unit (i.e. in each machine cycle), whereas the clocked microcommands are delivered only during those machine cycles in which the corresponding microcommands $C_1$ to $C_n$ are present.

FIG. 2 shows the control unit of the computer. The control unit comprises a read-only store memory (hereinafter ROS) 2, an output register for this store (hereinafter ROR for Read-Only Register) 3, a decoder 4, a ROS address register (hereinafter ROSAR) 5, an auxiliary register for storing the ROS addresses (hereinafter ROSAR1) 6, and a counting unit 7 for incrementing the ROS addresses.

The ROS memory 2 is designed for containing microinstructions having 18 bits, organized into microprograms which control the operation of the computer. The circles 9 to 16 represent sets of AND gates which control the transfer of signals on the connection lines associated with these sets of gates. As previously described, each set 9 to 16 is controlled either by a clock pulse $T_i$ or by a clocked microcommand $CT_j$. Each set receives at its inputs, and when enabled, releases at its outputs, a plurality of suitable signals on a set of wires represented by a single line and called hereafter a "channel".

A set of signals, representing a predetermined ROS address (in binary form) may be transmitted on channel 8, which is not conditioned by any set of AND gates. To initiate the operation of the computer, a predetermined ROS address may be forced on channel 8, by pre-setting suitable switches on a control console, and by pressing a START button which, through the wire START (see FIG. 1) initiates the operation of the clock unit.

The address thus generated on channel 8 is loaded in register ROSAR 5 and as soon as the set of AND gates 12 is enabled by a clock pulse, the ROS memory 2 is addressed, a microinstruction is read out, and, when the set of gates 16 is enabled by a clock pulse, the microinstruction is loaded in register ROR 3. The same microinstruction now present on the output leads of register ROR 3, is decoded by decoder 4, and the decoded signals are transferred to the clock network 21 through a network of OR gates 4A, and issue from the clock network 21 as a set of clocked microcommands $CT_1$ to $CT_n$ (as described above with respect to FIG. 1).

An ROS address contained in register 5 may be updated in different ways. First, the ROS address may be sent through the set of AND gates 13 into the register ROSARI 6. From there, through the enabled set of AND gates 14, it is applied to the incrementing network 7 where it is increased, for instance, by one. The updated address is then reloaded in register 5 through channel 17 when the set of AND gates 11 are enabled.

Alternatively, the address may be incremented by a suitable quantity K obtained by the microinstruction recorded in register ROR 3 and applied to the incrementing unit 7 through channel 18 and gates 15. By another alternative, a new address for ROS 2 00 may be obtained from the microinstruction read out from the ROS 2 and contained in register ROR 3. A suitable number of bits may be transferred through channel 18 and the gates 10 to register ROSAR 5.

A further addressing possibility is given by channel 19 which, when the set of gates 9 is enabled, loads into register 5 the content of a register A (which is one of the several registers comprised in the operating section of the computer, see FIG. 3). The contents of register A may originate, as described below, either from other registers of the operating section, or from an external peripheral unit, or from the main memory. Therefore, the ROS may be addressed by any source of information within the computer or connected to the same.

The described control unit also is characterized by "parallelism". The length (in bits) of the ROS addresses depends on the number of ROS memory positions which must be addressed and is independent of the length of the microinstruction read out from the ROS. For instance, the ROS addresses may each have a length of 15 bits, and are able, therefore, to address roughly 32,000 different memory locations. This requires that all of the channels employed for loading the ROS 2 addresses comprise 15 wires, and that registers 5 and 6 have 15 bit cells. The ROR register 3, on the other hand, has as many individual bit locations as are the bits forming the microinstruction, in this case 18. This means that, if the ROS address is obtained from a microinstruction contained in ROR 3, only 15 of the 18 bits are employed as address and transferred on channel 18.

According to the invention, during the execution of the microprogram it is possible to read out microinstructions from either the main memory or the microprogram memory ROS 2. Therefore, a bit of binary information which specifies if the address is a ROS address or a main memory address is supplied in conjunction with an address of a microinstruction to the control unit. This bit may be registered in flip-flop 24 associated with the register ROSAR 5.

As seen in FIG. 2, the flip-flop 24 may be loaded with a bit delivered on a wire among those forming the channel 19, through the AND gate 9'. Alternatively, it may be loaded with a specific bit of the microinstruction contained in register ROR 3 through the channel 18 and the AND gate 10'. Another possibility, is that the contents of flip-flop 24 may be forced through the wire 8' by a console key. (The loading mode of flip-flop 24 will be described below.)

The reading out of a microinstruction from the main memory requires the addressing, the reading out, and the transferring of the same. Therefore, the operation must be controlled by a number of subsequent microinstructions. These microinstructions are generated by a hardware sequencing circuit suitably connected to the portion of the control unit already described.

FIG. 2 shows the block diagram of the whole control unit according to the invention, and comprises therefore also the hardware sequencer and the related connections to the control unit, together with the modifications needed for putting the invention in effect. The hardware sequencer is represented by block 25.

Preferred embodiments of the sequencer are described in the above-mentioned patent application and also in the U.S. patent application Ser. No. 508,785 filed Sept. 24, 1974 by the same applicant. For the purpose of the present invention, it is sufficient to remark that the hardware sequencer may consist of a two-bit binary counter.

The sequencer is stepped on at each machine cycle by means of a clock pulse T applied to a suitable input lead 22. The clock pulse T, however, has effect only when the flip-flop 24 is set, that is, when the bit contained in flip-flop 24 is at 1 level. In other words, the output of the flip-flop 24 acts as enabling signal for the hardware sequencer 25. At each state of evolution, the hardware sequencer 25 generates a set of signals on its output leads 31. Such signals are applied through the set of gates 32 to the logical network 4A and generate a set of microcommands which are transferred to the timing unit. Such timed microcommands provide for reading out from the main memory certain information, having the character of microinstructions. Such information is recorded through the channel 29 and the set of AND gates 28 is an auxiliary register RORM 27.

The register RORM 27 is also connected through the set of gates 30 to the input leads of register ROR 3. It is possible to transfer to register ROR 3 the information contained in register RORM 27 simply by enabling the set of AND gates 30. When the information taken out from the main memory is contained in register ROR 3, the information acts as a microinstruction.

The logical network 4A, in the simplest form, may consist of a plurality of logical OR elements (or gates). The network 4A provides for transmitting to the timing unit the microcommands generated by register ROR 3 through the decoding network 4, or by the hardware sequencer 25, or by output leads of a transcoding auxiliary memory 23 (described below).

Flip-flop 24, hardware sequencer 25, auxiliary register RORM 27 together with the connections with the operating section and the main memory unit make possible the fetching and execution of microprograms stored in working memory, as explained in the above-mentioned patent applications.

It is now necessary to consider how the allowed and forbidden operating codes are managed. According to a preferred embodiment of the invention, a small transcoding memory 23 is associated with the ROS 2. Preferably, memory 23 has the same parallelism as ROS 2 and it is made by means of the same circuit technology. As will be seen, the microinstructions stored in the memory are, therefore, 20 bits in length. Memory 23, may comprise, for instance, 256 memory positions each having a transcoding digital word of 20 bits in length. The transcoding digital words in memory 23 may be addressed by an 8 bit address register (AMAR) 35. The addressing of memory 23 from the signal stored in register 35 is controlled through a gate set 36 that is enabled by timed microcommands.

The transcoding digital words are used during the fetching and execution phases of a machine instruction. These phases are carried out, by means of fetching and execution microprograms which perform suitable control functions to modify the microinstructions stored in ROS 2, as well as to supply the addresses of the microprograms which are necessary for carrying out machine instructions. For this purpose, the transcoding digital words are applied through gate sets 37 and 38 to decoding network 4A. Two gate sets 37 and 38 are represented to indicate in a general way that the transcoding digital words are applied in whole or in part and, in subsequent instants, under control of a plurality of timed microcommands. At least a portion of the transcoding digital words may be loaded through a channel 39 and a gate set 40 into ROSAR 5 in order to address ROS 2.

Register 35 may be loaded through a gate set 41 with information transmitted from a register B of the computer (which contains the operating code of a machine instruction). Alternatively, register 35 may be loaded with information from a transcoding digital word through a channel 42 and a gate set 43.

In the most general way, all information required to carry out fetching and execution of microprograms associated with a machine instruction may be contained in a single digital transcoding word having a length greater than 20 bit. However, in order to achieve an improved utilization of memory 23 it is preferable to distribute such information into two digital transcoding words.

The first bit of each digital word may indicate if the associated function code is an allowed one or a forbidden one. Such a bit is transferred on wire 44 and through an OR gate 45 to wire 46. From wire 46 it is forwarded to error signal generation logic or, more generally, to exception signal generation logic (which is not shown). When such a bit is 0, it means that the operating code is a forbidden one and the corresponding macroinstruction cannot be carried out by the microprograms resident in ROS. The exception signal causes the computer to stop the program execution and start a suitable procedure. All the remaining bits of the forbidden digital word are not used for interpreting the forbidden operating code. In general, they remain unused. However, they are available for extending the allowed digital words.

Therefore, it is convenient and desirable to relate such bits to a digital transcoding word corresponding to an allowed operating code, and to read out such bits by addressing the forbidden digital word by means of a certain number of bits of an allowed digital word. In this way, the length of the allowed digital words are extended without requiring additional space in the transcoding memory 23.

In order to avoid the need for a register at the output of memory 23 for storing all the information pertaining to the allowed digital word and to its extension, the information contained in the extension is preferably related to a second phase of the microprogram (the execution phase) and is read out from memory 23 at the beginning of such a second phase. Upon beginning the second phase, an exception signal will be generated unless the first bit is masked. The timed microcommand which enables gate set 36 for reading memory 23, provides a set command to a flip-flop 47 whose inverted output is connected to an input of OR gate 45. When a first digital transcoding word is read out, flip-flop 47 is set and the inverted output goes to logical level 0. The output of OR gate 45 depends therefore on the value of the first bit of the digital word which is read out. When the extension of the digital word (which is a second digital word) is read out by a second microcommand, flip-flop 47 is reset and the inverted output goes to 1. The output of OR gate 45 goes to or remains at 1, and the first bit of the word which is read out is masked.

It is now desirable to provide a general description of the operation of the control unit as regards the performing of the operating codes. Basically the control unit generates a set of microinstructions for carrying out machine instructions designated in the program for the computer. In order to carry out a machine instruction, the operating code of the machine instruction is loaded into register 35 through gate set 41 by means of a microprogram routine stored in ROS 2. The operating code stored in register 35 is used as an address of a corresponding 20 bit fetching transcoding digital word in memory 23. The first 12 bits of the fetching digital word are applied through gate sets 37 and 38 to decoding network 4A. The other 8 bits are maintained on channel 42 during the time period of a first fetching phase of the microprogram. These latter 8 bits are used as an address to select another digital word stored in memory 23 to be used during a second phase (the execution phase) of the microprogram. The first transcoding digital word read out of memory 23 complements the information content of the fetching microinstructions read out of ROS 2 by conditioning decoding network 4A. During the fetching phase of the microprogram stored in ROS 2, and by command of the microprogram itself, gate set 43 is opened and register 35 stores the address of another word in memory 23 associated with the machine instruction being carried out. As soon as gate set 36 is opened, this second word is read out of memory 23 and is used by the control unit to condition decoding network 4A or to suitably address ROS 2 through channel 39 and gate set 40.

A preferred formatting of the first digital word stored in memory 23 for each operating code is as follows:

Bit 0: Existing/non-existing code which is equivalent to allowed/forbidden instruction code. The bit is set to 1 when the operating code loaded in register 35 is one of those contained in the interior decor (I/D) of the computer. It is set to 0 if the operating code is not contained in the I/D.

Bits 1–3: Each bit idenntifies whether the machine instruction has to be interpreted and executed when the computer is in a particular mode of operation. For example, in the initializing mode, all the machine instructions may be executed. In the privileged mode or supervisor mode, certain instructions must not be executed. During branch instructions, a bit must specify if the branch is absolute or relative.

Bits 4–5: Length of instruction: The bits define the length of the machine instruction in characters, so that the microprogram knows how many characters have to be read out from the main memory and further knows in which working registers the characters must be stored.

Bits 6–8: Field verification: Since a machine instruction is often defined not only by the operating code, but also by other fields (for instance an operating code complement), a computer may execute a certain instruction having a certain operating code, provided that certain fields have a verified content. Machine instructions having a different field content will be executed only if they are identified as additional machine instructions. These bits complement the information provided by bit 0.

Bit 9: Segment violation (execute violation): If bit 9 is set to 1, the machine instruction provides for a jump and the computer must verify that the jump address is still within the appropriate memory segment. The concept of memory segmentation is well known; instructions and data are stored in the memory grouped according to some common characteristics. Typical is the organization in two segments: one for information which must be read and executed (say instructions) but not erased, and another one for information which must be read or erased and rewritten but not interpreted (say data). Other data (such as transcoding tables) may only be read, but not interpreted or erased.

Bit 10: Segment violation (write violation): If this bit is set to 1, the machine instruction requests a write operation in the main memory and the computer must verify that the memory address points to the appropriate segment for which writing is allowed.

Bit 11: Instruction with address syllable: If the bit is set to 1, a field of the instruction is not an operand address, but an address of a memory zone where the true address and other information are contained.

Bits 12–19: Address of the second digital word in memory 23.

A preferred formatting of the second digital word stored in memory 23 for each operating code is as follows:

Bit 0: The bit is set to 0 so that, if the operating code directly addresses any execution word, the operating code is recognized as illegal.

Bits 1–3: Formatting bits: These bits indicate that the machine instruction requires a specific operation within a group of related operations, e.g., subtraction (binary or decimal) and addition (binary or decimal).

Bits 4–19: Execution phase pointer: These bits address the first microinstruction of an execution microprogram.

The transcoding memory 23 allows the immediate identification of an operating code as allowed or forbidden. If the operating code is allowed, all of the necessary information for carrying out the machine instruction by means of microprogram corresponding to the operating code is supplied. If the operating code is forbidden, the exception signal, generated on wire 46, provides the computer with an exception indication which forces into register ROSAR 5 the address of a microprogram for testing exceptions and initiates a routine for testing the operating code. These operations will be described below after the description of the computer is completed.

FIG. 3 shows the block diagram of the operating section of the computer, which is described summarily and only for the sake of the completeness of the description. It consists substantially of two banks of registers 50, 51, a working register A, and an operating network 52.

The register bank 50 comprises 16 registers having 18 bits each, and is addressed by a code of microcommands through the input leads 53. By means of such addressing, and by jointly controlling either the set of gates 54 at the inputs of the register bank, or the set of gates 55 at the output of the same, a piece of information coming from channel 56 may be recorded in an addressed register and, alternatively or concurrently, the information already contained, or being recorded, in the addressed register may also be recorded in the register A.

The contents of the register A is in turn applied to the distributing channel 57 and, through the operation of gates 70 and 71 may be selectively applied to the operating network 52. The contents of register A may also be transmitted through channel 58 and gates 59 to the register bank 51. This bank may also comprise 16 registers having 18 bits each, and be addressed by a code of microcommands through the input leads 60. The contents of the addressed register is always present on the distributing channel 61 and may be applied therefrom selectively through gates 72 and 73 to the operating network 52.

The addressed register in the register bank 51 may in turn be loaded with information originating from several sources. It has already been explained how the data contained in A may be transferred to the bank 51 through channel 58 and the AND gates 59. Another possible source is a data channel originating from external peripheral sources. Such channel is identified by DATA In and is controlled by the set of gates 62. The data coming in from the main memory on channel 128 are transferred to the register bank 51 through a set of AND gates 63 and are to be processed by the operating section. Also the read-only, microprogram memory ROS may send data to the bank 51 for recording. A connecting channel 64 between the output of the register ROR (see FIG. 2) and the register bank 51 is provided. This channel is controlled by the set of gates 65. It is also possible to force on the register bank 51 information through a channel 66 (LOAD) controlled by the set of gates 67. The channel 66 may be fed by pieces of information generated by the console switches controlled by the operator.

The register banks 50 and 51 may be controlled in parallel for addressing one, and only one register, in each one of the banks at a time. For bank 50 this is apparent by the connection to register A, but the same is true also for the bank 51 which, with respect to the operating structure of the computer, is seen every time as a single register B.

The registers A and B provide the required contemporaneous physical support for two data fields which are presented to the operating network for processing. The operating network is connected to registers A and B by means of distributing channels 57 and 61 and by means of a number of gates. These gates are conveniently organized in sets 70 to 73 according to the format of the data to be processed (binary, packaged or unpackaged decimals), to the type of operation to be performed, and to the parallelism of the registers and of the operating network.

In the preferred embodiment, the registers and the operating network 52 have a parallelism of 18 bits.

This allows performing in parallel predetermined operations on two bytes, without excluding the possibility of operating either on a single byte or on a zone of the byte.

The gates connecting the inputs of the operating network 52 to the distributing channel 57 and 61 are divided in sets 70, 71, 72, 73. The circle representing each set carries the order number of the bits transferred. In a like manner, the outputs of the operating network are connected to a collector channel 74 through sets of gates 75, 76. The outputs of the operating network are also connected through AND gates 77 and 78 to a decoder 79 which is responsive to peculiar output codes, such as "all ones" for the set of bits corresponding to the gates enabled.

The signal NZ2 at the output of the decoder is a signal of "condition verified". It is used for submitting the operations performed by the operating unit to suitable checks.

The operating unit may be implemented according to well known electrical circuits preferably employing integrated circuit technology. A detailed description of such operating network may be found in the extensive literature available on the design of electronic computers. The authoritative text of R. S. Ledley "Digital Computer and Control Engineering", part 4, published by McGraw-Hill, is particularly cited as within this literature. In addition, co-pending U.S. patent application Ser. No. 485,468 filed on July 2, 1974 by the applicant, describes a specific embodiment wherein the operating unit comprises different networks functionally independent. This application may be referred to for further details.

The operating network should in general perform operations of the following types: arithmetical binary or decimal operations; logical operations such as AND, OR, EXCLUSIVE OR, COMPARE; data shifting operations; incrementing and decrementing operations by one or more unities. The type of required operation is defined by a set of microcommands 80 received from the control unit.

To complete the description of the operating section, the collector channel 74 is connected to channel 56. The data present on the collector channel 74 as result of operations performed by the operating network 52, may be transferred and recorded in a suitable register of the bank 50. From there it may be transferred to register A and then to bank 51. Recording in the main memory, or transferring to an external peripheral device may then be performed. Channel 69 is connected to the main memory. Channel 81 from the output of the set of gates 82 provides a path for transferring information from the computer to the peripheral devices by means of a control network controlling this exchange of information. (A description of such a control network is not necessary for the understanding of the invention and is not included.)

The operating section also comprises two by-pass channels 83 and 86 controlled by sets of gates 87 and 88 for directly connecting the distributing channels 57 and 61 to the collector channel 74. In addition, a number of flip-flops (not shown) are provided for recording special conditions, such as carry-in and carry-out or the results of checks performed by specialized decoders.

FIG. 4 shows the block diagram of the memory section of the computer. The memory section comprises a main memory 122 (for instance a magnetic core memory) having a parallelism of 18 bits, an addressing register AR, a data register DR and a number of communication channels. The addressing register AR receives from channel 57 through a set of AND gates 124, the coded information stored in register A of the operating section (see FIG. 3).

The register AR has a capacity adapted to the maximal foreseen memory capacity. For instance, a register having 18 bit locations may address approximately 256,000 memory positions and is congruent with the parallelism of the described computer.

The data to be written in main memory 122 are transferred to register DR through channel 69 controlled by the set of AND gates 125 and are delivered from the register B of the operating section. The data recorded in register DR are transmitted to the main memory 122 through channel 123. The data read out from the memory are transmitted on channel 127 and are loaded, through the set of gates 126, in register DR, and, therefrom, are applied through channel 128 to register B.

An additional channel 129, at the output of register ROSAR (refer also to FIG. 2) controlled by the set of gates 134, is provided for addressing the main memory 122. Through this channel 129 a microinstruction address may be loaded in register AR, for addressing a position of the main memory 122 in place of a ROS position.

The output of register DR is also connected to register RORM through the channel 29 and the set of gates 28 (see FIG. 2) so that the contents of DR may be used as a microinstruction by the control unit.

In order to more fully understand the preferred embodiment, an example of fetching a machine instruction by means of the microprogrammed control unit using memory 23 will now be described.

In order to start the fetching, a fixed address of a first microinstruction in a microprogram is forced into ROSAR register 5 through channel 8. This microprogram loads into working registers of the computer 50 and 51 data pertaining to a specific program to be executed. The program includes a number of machine instructions which must be executed in order to complete the requisite calculations. Once the data pertaining to the program (for instance, execution modality and the address of the first machine instruction in the program) have been loaded into main memory the fetching of the first machine instruction in the program begins.

The control unit loads into ROSAR register 5 the address of the first microinstruction of the fetching microprogram. The first character of the machine instruction, e.g., the operating code, is read out from the computer memory, loaded into suitable working register B, and transferred to register 35 through gate set 41. As soon as gate 36 is enabled, a first digital word corresponding to the operating code is read out of memory 23, and, when transferred through gate sets 37 and 38, it is available to cooperate with the microprogram stored in ROS 2 for fetching the remainder of the machine instruction. More specifically, the word from memory 23 is transmitted to decoding network 4A and is used as a parameter for generating microcommands which depend jointly on the contents of such words and the microinstructions stored in ROS 2.

One advantage of this arrangement is that a single fetching microprogram can be used to interpret all of the macroinstructions contained in the interior decor of the computer, irrespective of format. In other words, even though the machine instructions may have different lengths in bytes and different fields requiring different interpretation, only a single microprogram is used to fetch all of the instructions and put them into condition for execution.

As soon as the decoded information from the digital word is available, the microprogram stored in ROS 2 executes some additional controls. First, bit 0 of the transcoding digital word is detected in order to make sure that the machine instruction can be executed.

If this first bit of the transcoding digital word is 1, the microprogram proceeds with the fetching phase. The various bytes of the machine instruction are read out of main memory and are loaded into suitable registers.

This operation continues under control of the information contained in the transcoding digital word until all of the contents of machine instructions have been fetched. During this period of time, specific tests can also be imposed by the microprogram, such as an execute violation test, a write violation test, etc.

During the fetching of the machine instruction, a suitable microinstruction of the microprogram enables gate set 43 to load 8 bits of the first transcoding digital word into register 35. These bits serve as the address for a second digital word which is read out from memory 23. Sixteen of the bits of the second digital word are transferred over channel 39 and through gate set 40 to the ROSAR register 5. These bits serve as an address of the first microinstruction of a second phase of the microprogram stored in ROS 2. This phase preferably coincides with the execution phase. The remaining 4 bits of the second digital word are used by the decoding network 4A to complement with pharametrical information the microcommands generated by the microprogram.

The above is valid in the case where the operating code read out from the memory is an "allowed" code. Suppose now that the operating code read out is a "forbidden" operating code, that is a code pertaining to a machine instruction for the management of which a suitable microprogram has been written and stored in a convenient area of the working memory (as opposed to the ROS memory).

In this case, when such an operating code is read out from the memory and loaded into register 35, it addresses a position of the auxiliary memory 23 in which a "forbidden" digital word is contained. Consequently, the reading out of the memory 23 generates on wire 46 a signal with logical level 0. Such a signal (which is a signal of exception or irregularity) forces into the ROSAR register 5 a microprogramming address (which for convenience is named microprogram No. 2).

Microprogram No. 2 has the task of analyzing and identifying the cause of an exception signal. (It is a general routine).

For example, the identification can be performed as follows. The signal on wire 46 and the signals on other similar wires of exception (which are not shown) are loaded into a register of the bank 50, each in a prefixed binary position. A subsequent microinstruction with a particular binary content (called a "mask") is loaded into a convenient register of the bank 51. The binary content of the "mask" is used for revealing a "forbidden" operating code and can, for instance, be all ones except in the binary position corresponding to the signal indicating a "forbidden" operating code has generated an exception. The loading of the mask is performed through channel 64. The subsequent microinstruction may command the logic sum (OR) performed among the exception signals and the mask in the operating network 52.

If the exception for the "forbidden" operating code is not present (logical level 1) the outputs of the operating network 52 will be all at logical level 1. The decoding network 79 will supply a signal NZ2 at logical level 1 that is stored in a flip-flop of condition (which is not shown). If the exception for "forbidden" operating code is present (logic level 0), the outputs of the operating network 52 will all be at the logical level 1 except one. The decoding network 79 will supply a signal NZ2 at logical level 0 which is stored in the flip-fop of condition already mentioned.

A subsequent microinstruction may command a conditional jump as follows. If the flip-flop of condition is set, the incrementation by one unit of the microinstruction address is enabled through gate set 11. If it is reset, a new address is imposed through the gates 10 or an incrementation by more than one unit (through gates 15 and 11). In one case the microprogram proceeds with the examination of other exception signals by means of suitable masks. In the other one it calls for a new microprogram named microprogram No. 3 for the management of the exceptions due to a "forbidden" operating code. Microprogram No. 3 causes reading from a reserved position in working memory. At this position is found information telling firstly, whether there are "additional" microprograms in working memory for executing operating codes and if so, secondly, whether there is such an additional microprogram for the introduced operating code and if so thirdly, the working memory address of that microprogram (called microprogram No. 4) for fetching and execution of the additional instruction. Microprogram No. 3 substantially performs these steps by loading into a working register (of bank 50 or 51) the contents of a working memory reserved position and examining these data by means of successive "masks" for particular bits and commanding a conditional jump when detecting appropriate data bits (as described above).

If it is verified that additional codes are not present, the program instruction cannot be performed and the irregularity is pointed out by interrupting the program and by recalling a supervisor program. On the other hand, if it is verified that additional codes are present, one must verify if the required instruction is included among those additional codes and call a microprogram routine No. 4 for executing the additional code. In particular for the addressing of microprogramming routine resident in the working memory, the flip-flop 24 (FIG. 2) is set and the memory addressing is performed indirectly by finding out the effective address of the microprogram routine No. 4. Microprogramming routine No. 3 compares the operating code contained in register 35 (and stored also in a register of the bank 50 or of the bank 51) with a table of additional operating codes. Each of the additional operating codes is associated with a microprogram address for the operations carrying out the corresponding instruction. When the operating code is identified, an instruction comes from the memory routine to initiate carrying out of the effective fetching and executing microprograms.

On the contrary if the operating code is not identified after having explored all of the table of additional operating codes, the intervention of a supervisor program is recalled. It should be noted that the interpretation mechanism described is not used systematically, but only when the "forbidden" operating code appears. On the contrary the recognition of the allowed operating codes is immediate and the relative machine instructions are therefore carried out in very short operating times.

It should be further noted that in the case of additional operating codes, the general check on the causes of exception and on the existence of additional operating codes is performed by microprograms resident in ROS which therefore are executable with very high speed. Also the recognition of the additional operating codes is performed by a microprogram resident in the working memory and therefore the operating times are relatively short. Similarly, the carrying out of the additional instructions is performed by microprograms and consequently the operating times are relatively short even if said microprograms are resident in working memory.

This invention offers consistent advantages if compared to known systems for the extension of the Interior Decor. Where machine instructions are not included in the Interior Decor they can be carried out by means of programs that convert such forbidden machine instructions into a plurality of allowed machine instructions.

Finally, it should be noted that the fetching of additional machine instructions and therefore the expansion of the Interior Decor does not require any structural changes to the computer. In fact, the addition of operating codes does not require any change in the auxiliary memory 20 nor does the addition of microprograms in the main memory require changes to the microprogramming (ROS) memory.

The indirect addressing of the additional microprograms resident in the main memory disengages the positioning of microprograms from the rigidly fixed contents of the ROS. The only constraint between ROS and working memory is that the reserved memory positions indicated by microprograms resident in ROS cannot be modified and must be reserved for the specific functions foreseen a priori.

What is claimed is:

1. In a computer of the type with read-write working memory and a microprogrammed control unit provided with a read-only microprogramming memory containing microprograms for executing so-called "allowed" machine instructions, a system for extending interior decor capability which comprises:
    transcoding means coupled to said working memory for receiving operating codes of machine instructions stored in said working memory and for providing an output signal of a first level when the received operating code is one of said "allowed" machine instructions, and for providing an output signal of a second level when the received operating code is not one of said "allowed" machine instructions;
    memory means in said working memory for storing therein so-called "additional" microprograms for executing a set of so-called "additional" machine instructions;
    control means coupled to said transcoding means and responsive to said output signal of a first level for initiating fetching and execution of said "allowed" machine instructions in said microprogramming memory and responsive to said output signal of a second level for accessing said working memory to determine if there is an "additional" microprogram in said working memory corresponding to said received operation code; and
    circuit means coupled to said memory means and responsive to said control means for initiating fetching and execution of said "additional" microprogram.

2. A system as recited in claim 1 wherein said transcoding means is coupled to said working memory indirectly by an operating unit which processes said machine instructions.

3. A system as recited in claim 1 wherein said control means generates an exception signal in response to said output signal of a second level.

4. A system as recited in claim 3 further comprising first means responsive to said exception signal for initiating a first microprogram of examination resident in the microprogramming memory for determining that the cause of said exception signal is detection of a so-called "forbidden" operating code.

5. A system as recited in claim 4 wherein, said first means initiates a second microprogram of examination resident in said microprogramming memory for determining if an additional microprogram is resident in said working memory for locating in said memory means the address of one of said "additional" microprograms corresponding to said "forbidden" operating code.

6. In a microprogrammed computer, a system for extending so-called interior decor which comprises:
    a working memory for recording machine instructions with operating codes and for recording additional microprograms for carrying out so-called additional machine instructions; and
    a microprogrammed control unit which includes:
        a microprogrammed memory for recording a first set of microprograms for carrying out so-called "allowed" machine instructions and a second set of microprograms for carrying out exception routines;
    first means coupled to said working memory for receiving and decoding said additional microprograms and coupled to said microprogramming memory for receiving and decoding said first set of microprograms;
    second means coupled to said working memory for receiving said operating codes and for classifying said operating codes as "allowed" or "forbidden";
    said second means also coupled to said control unit for initiating the execution of said first set of microprograms in response to said "allowed" operating codes, and for initiating the execution of said second set of microprograms in response to said "forbidden" operating codes; and
    said control unit also coupled to said working memory for determining if working memory contains said additional microprograms corresponding to said "forbidden" operating codes and, if such a determination is made for causing the transmission of said additional microprograms to said first means.

7. A system as recited in claim 6 wherein said second means comprises a transcoding memory which receives said operating codes, said transcoding memory storing and transmitting:
    a first type of microword in response to said "allowed" operating codes, and
    a second type of microword in response to said "forbidden" operating codes.

8. A system as recited in claim 7 wherein said first type of microword comprises information which when decoded initiates the execution of said first set of microprograms.

9. A system as recited in claim 7 wherein said second type of microword comprises information which when decoded initiates the execution of said second set of microprograms.

10. A system as recited in claim 7 further comprising third means responsive to microwords of said first type for masking at least one bit of a microword of said second type, whereby the initiating of the execution of a microprogram of said second set is avoided.

* * * * *

UNITED STATES PATENT AND TRADEMARK OFFICE
CERTIFICATE OF CORRECTION

PATENT NO. : 3,949,372
DATED : April 6, 1976
INVENTOR(S) : Antonio Brioschi

It is certified that error appears in the above-identified patent and that said Letters Patent are hereby corrected as shown below:

The assignee should read as follows:

Honeywell Information Systems Italia
    Caluso, Italy Signed and Sealed this Twelfth Day of October 1976

[SEAL]

Attest:

RUTH C. MASON
*Attesting Officer*

C. MARSHALL DANN
*Commissioner of Patents and Trademarks*